No. 777,426. PATENTED DEC. 13, 1904.
Y. P. LEE.
BOTTLE.
APPLICATION FILED MAR. 3, 1904.
NO MODEL.
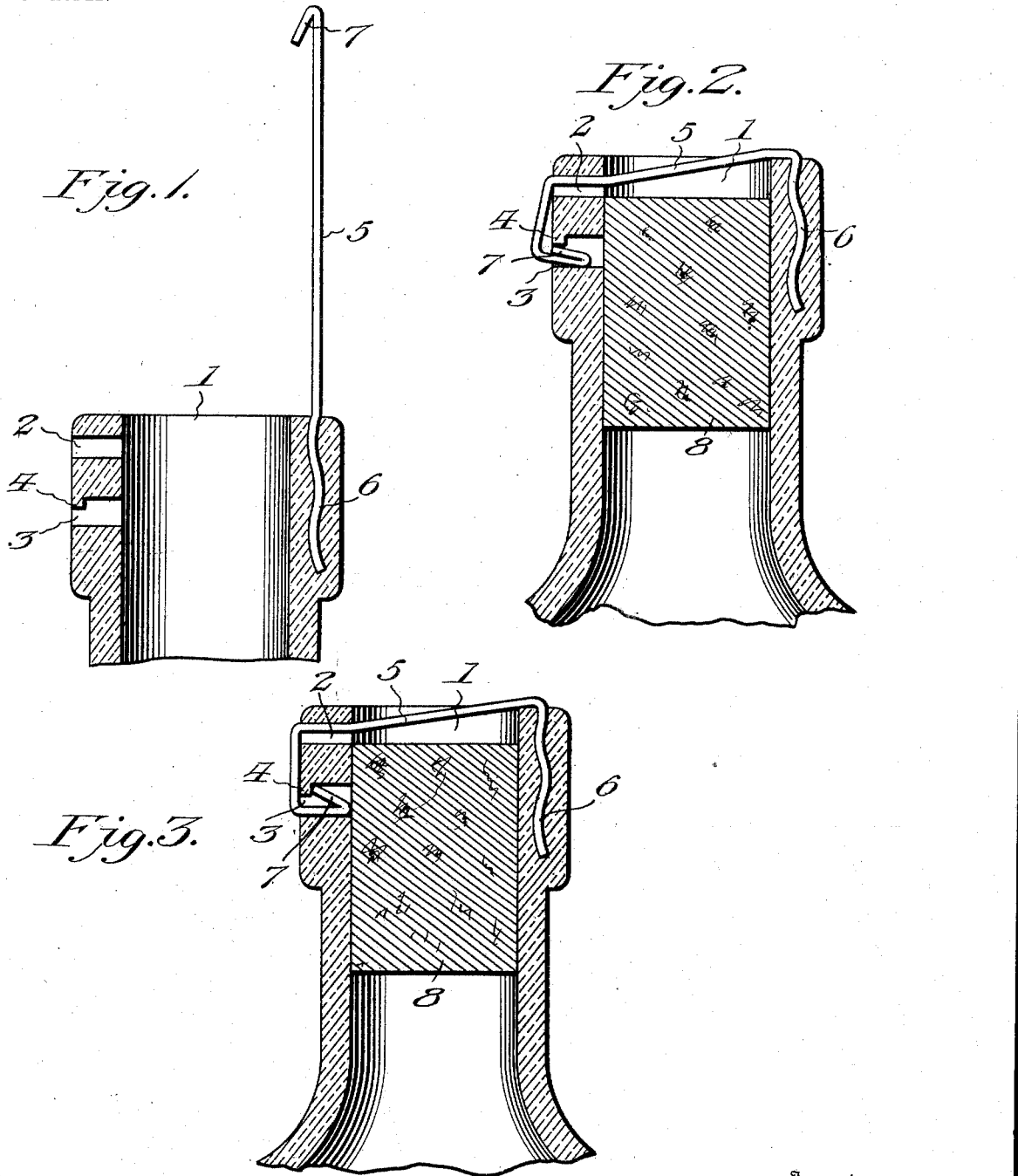
Witnesses
Edwin G. McKee
Herbert D. Lawson
Inventor
Yan Phou Lee
By Victor J. Evans
Attorney No. 777,426.      Patented December 13, 1904.

UNITED STATES PATENT OFFICE.

YAN PHOU LEE, OF LINCOLN, DELAWARE, ASSIGNOR OF ONE-THIRD TO CLUE HOY, OF NEW YORK, N. Y.

BOTTLE.

SPECIFICATION forming part of Letters Patent No. 777,426, dated December 13, 1904.

Application filed March 3, 1904. Serial No. 196,366. (No model.)

*To all whom it may concern:*

Be it known that I, YAN PHOU LEE, a subject of the Emperor of China, residing at Lincoln, in the county of Sussex and State of Delaware, have invented new and useful Improvements in Bottles, of which the following is a specification.

My invention relates to new and useful improvements in bottles; and its object is to provide a simple and effective seal by means of which a cork or other closure placed within the bottle-neck can be locked in position and cannot be removed unless either the seal or the bottle is broken.

The invention consists of a strand of wire, one end of which is embedded within the bottle-neck, while the other end is provided with a hook which is adapted to be inserted through apertures formed within the opposite side of the bottle-neck and which will be automatically locked therein.

The invention also consists in the novel construction, combination, and arrangement of parts, as hereinafter fully illustrated, described, and claimed.

In the accompanying drawings, Figure 1 is a section through a portion of a bottle-neck, showing my improved seal before the same is secured in position across the bottle-neck. Fig. 2 shows the position of the sealing-wire before the same is locked within the apertures. Fig. 3 is a view similar to Fig. 2, but showing the wire locked in position.

Referring to the drawings by numerals of reference, 1 is a bottle-neck, having an aperture 2 in one side thereof, and immediately below this aperture is a second aperture 3, having a shoulder 4 formed upon one wall thereof. Embedded within the opposite side of the bottle-neck is a wire strand 5, that portion of the strand which is embedded in the neck being preferably waved, as shown at 6, so as to prevent it from being withdrawn from the neck. A hook 7 is formed at the free end of the strand, as shown.

When it is desired to seal a bottle such as herein described, a cork 8 or other suitable closure is inserted into the neck, so as to cover the inner end of the aperture 3, but leaving both ends of aperture 2 exposed. The strand 5 is then inserted through the aperture 2 and is bent downward and the hooked portion thereof is then inserted into the aperture 3 from the outer end and will automatically expand and engage the shoulder 4. The withdrawal of the strand from the apertures 3 and 2 is thus prevented and the position assumed by said strand over the outer end of the cork 8 prevents said cork from being extracted unless the neck 1 is broken or the strand 5 is cut.

In the foregoing description I have shown the preferred embodiment of my invention; but I do not limit myself thereto, as I am aware that modifications may be made therein without departing from the spirit or sacrificing any of the advantages of the invention, and I therefore reserve the right to make such changes as properly fall within the scope of my invention.

Having thus described the invention, what is claimed as new is—

1. In a bottle, the combination with the neck thereof having an aperture in one side; of a flexible strand secured in the neck and adapted to be inserted into the aperture, and means integral with the neck and strand respectively, whereby said strand may be locked within the aperture.

2. In a bottle, the combination with the neck thereof having apertures in one side thereof, of a flexible strand permanently secured in the opposite side of the bottle-neck and projecting from the end of said neck, a hooked end to the strand, said strand being adapted to be inserted into the apertures, and means for locking the strand within the apertures.

3. In a bottle, the combination of the neck thereof having apertures in one side, and a shoulder in one of the apertures, of a flexible strand permanently secured in the opposite side and extending from the end of the neck, and a hook at the outer end of the strand, said strand being adapted to be inserted through the apertures and the hook to automatically engage the shoulder.

4. In a bottle, the combination with the neck thereof having apertures in one side thereof, and a shoulder in one of the apertures, of a flexible strand having a waved portion embedded within the opposite side of the neck, said strand extending from the end of the neck, and a hook at the free end of the strand, the strand being adapted to project into the apertures, and the hook to automatically engage the shoulder.

In testimony whereof I affix my signature in presence of two witnesses.

YAN PHOU LEE.

Witnesses:
    ELLIOT S. BENEDICT,
    JOHN B. B. FISKE.